United States Patent [19]

Cash

[11] 3,975,500

[45] Aug. 17, 1976

[54] PROCESS FOR PRODUCING HIGH ACTIVE OXYGEN, LOW BULK DENSITY SODIUM PERBORATE

[75] Inventor: Donald Edwin Cash, Memphis, Tenn.

[73] Assignee: E. I. Du Pont de Nemours and Company, Wilmington, Del.

[22] Filed: Aug. 29, 1974

[21] Appl. No.: 501,789

[52] U.S. Cl. .............................. 423/281; 23/313 R
[51] Int. Cl.² .......................................... C01B 15/12
[58] Field of Search ........... 423/266, 274, 279, 281; 264/117; 23/313

[56] References Cited
UNITED STATES PATENTS

| | | | |
|---|---|---|---|
| 2,706,178 | 4/1955 | Young | 23/313 X |
| 3,278,276 | 10/1966 | Pellens | 23/313 |
| 3,700,414 | 10/1972 | Dillenburg et al. | 423/279 |

FOREIGN PATENTS OR APPLICATIONS

| | | | |
|---|---|---|---|
| 1,209,557 | 1/1966 | Germany | 423/297 |
| 1,065,832 | 4/1967 | United Kingdom | |

*Primary Examiner*—G. O. Peters

[57] ABSTRACT

Sodium perborate having an active oxygen content of about 11.0 to 12.0 weight percent and a bulk density of about 0.40 to 0.70 g./cc. is made by a process comprising (1) agglomerating conventional sodium perborate tetrahydrate with hydrogen peroxide to form spherical particles and (2) drying the resulting particles at a temperature below 45°C.

3 Claims, No Drawings

PROCESS FOR PRODUCING HIGH ACTIVE OXYGEN, LOW BULK DENSITY SODIUM PERBORATE

BACKGROUND OF THE INVENTION

This invention relates to a method of producing sodium perborate having a high active oxygen content and low bulk density.

Sodium perborate is frequently utilized in detergent products, many of which contain spray-dried components having mean particle sizes of about 30 to about 40 mesh and bulk densities of about 0.3 g./cc. These spray-dried components are produced by spraying a liquid solution or slurry through a heated zone and recovering discrete particles of detergent ingredients resulting therefrom. Since conventional perborate compounds normally have a higher bulk density of 0.75 to 0.95 g./cc. and extremely small particle size, they tend to segregate from detergent formulations made by mixing these sodium perborate materials with the spray-dried particles. Thus, there arose a need for sodium perborate having low bulk density.

The usual sodium perborate of commerce is a compound of the formula $NaBO_3 \cdot 4H_2O$ which is also written as $NaBO_2 \cdot H_2O_2 \cdot 3H_2O$. It is called "sodium perborate tetrahydrate" or more commonly "sodium perborate". This latter term will generally be used herein.

Methods of producing low bulk density perborate have been proposed. British Patent 1,065,832 discloses a process for making granulated sodium perborate having average particle sizes of 0.5 to 2 mm. and bulk densities of 0.3 to 0.5 kg./liter with active oxygen content of 11% or less. The material is made by spraying a sodium perborate, the water content of which has been reduced to less than 2.8 moles per formula unit, with an amount of water sufficient for the reforming of the sodium perborate tetrahydrate and containing a dissolved binder while the starting material is kept in moderate motion. Suitable binders are carboxymethyl celluloses, polyvinylpyrrolidone, carboxyl-group containing polyacryl- or poly-methacryl compounds, sugar, polyvinyl alcohols and dextrin.

U.S. Pat. No. 3,661,510 issued to Winkley on May 9, 1972 discloses sodium perborate crystals having a bulk density of from about 0.3 to about 0.6 g./cc. and a size larger than 60 mesh. The crystals are in the form of prismatic crystals having a specified length:width ratio. The sodium perborate disclosed therein is produced by reacting together, at 25° to 45°C., hydrogen peroxide and sodium metaborate in a molar ratio of $H_2O_2:BO_2$ of 1:1 in the presence of externally prepared, preformed seed crystals of sodium perborate tetrahydrate having a length:width ratio of at least 3:1, and separating the resulting sodium perborate crystals from their mother liquor.

U.S. Pat. No. 3,403,984 issued to Mollard on Oct. 1, 1968 discloses a process for preparing a high strength hollow, unitary crystalline agglomerate sodium perborate having an apparent density between 0.35–0.50 by simultaneously introducing an aqueous sodium metaborate and a solution of hydrogen peroxide into a container and cooling the solution to below 5°C. to produce fine crystals that agglomerate. These initial agglomerates thus formed are introduced into a continuously formed supersaturated solution of sodium perborate which maintains the agglomerates as a fluid bed in suspension. Thereby the initial sodium perborate agglomerates are covered with a layer of sodium perborate which increases the strength of the agglomerates.

Belgium Pat. No. 779,306 discloses the preparation of an abrasion-resistant sodium perborate monohydrate by moistening normal perborate monohydrate with at least 5 weight % water with respect to the perborate monohydrate at 20–90°C. and then drying, first at 40°C. and increasing the temperature to 90°C. maximum. Moistening may be effected with pure water or with dilute aqueous solutions containing substances having no adverse effects on the active content or the speed of dissolution. Such substances include hydrogen peroxide. A rotating tube is disclosed as a suitable apparatus for accomplishing the required moistening.

Polish Pat. 40,766 issued to Stanislav Karczewski on Apr. 1, 1958 discloses adding up to 15% by weight hydrogen peroxide to a hydrated sodium silicate waterglass containing about 25% water. The hydrogen peroxide-silicate mixture is held for 12 hours after which the bulk very slowly swells and coagulates. The product obtained is dried at a temperature not exceeding 30°C. for about 3 hours to yield a product having a light mass and emitting active hydrogen peroxide which during the preparation of the composition remains trapped in the mass.

In spite of the prior art methods, new or improved methods of producing sodium perborate having suitable properties for detergent formulation are desirable.

SUMMARY OF THE INVENTION

A process has been discovered whereby sodium perborate having a high active oxygen content and low bulk density can be made.

Specifically, it has been found that sodium perborate having an active oxygen content of about 11.0 to 12.0 weight percent and a bulk density of about 0.40 to 0.70 g./cc. can be prepared by agglomerating preformed sodium perborate having an active oxygen content of 10 to 10.5% by weight and a bulk density of about 0.80 to 0.95 g./cc. with hydrogen peroxide to form spherical particles and drying the resulting agglomerated particles at a temperature below 45°C. On a 100% basis the amount of hydrogen peroxide used in the agglomeration step is about 0.1 to about 15 weight percent based upon the weight of the starting sodium perborate.

DESCRIPTION OF THE INVENTION

The starting sodium perborate for the process of the invention is any commercially available sodium perborate tetrahydrate, $NaBO_2 \cdot H_2O_2 \cdot 3H_2O$, which has an active oxygen content of 10 to 10.5% by weight and a bulk density of about 0.80 to 0.95 g./cc. The particle size of the starting sodium perborate is not critical but will usually be about 60 mesh (250 microns), since the commercially available material is normally this size. Fines or material that is off-grade because of particle size may serve as starting material for the process disclosed herein.

Any commercially available hydrogen peroxide solution can be utilized in the process of the invention. Normally the concentration of the hydrogen peroxide solution will be between 10 and 90 weight percent, which is the usual range of the commercially available material. In general, relatively concentrated hydrogen peroxide solutions, i.e., 20-70%, will be used, since such use diminishes the amount of water which must subsequently be removed.

The hydrogen peroxide serves as a wetting agent and binder in the process of the invention wherein the sodium perborate tetrahydrate starting material is first contacted with the hydrogen peroxide solution. The amount of hydrogen peroxide itself, which is added, should be about 0.1 to 15% by weight of the amount of the starting sodium perborate. The concentration and volume of hydrogen peroxide solution added depends upon the particle size of the starting sodium perborate tetrahydrate, the agglomerating apparatus and the perborate product desired. The preferred amount of hydrogen peroxide to be used in the agglomeration step of the process of the invention is between about 1.0 and 3.0 weight percent based on the weight of the product.

In the process of the invention the sodium perborate starting material is contacted with the hydrogen peroxide solution in any apparatus sufficient to provide shear forces needed for agglomerating the perborate and to give good mixing. Subsequent to agglomeration, the resulting material is dried in any type of drying apparatus at a temperature below about 45°C. to remove all the free water added with the hydrogen peroxide and that released from the hydrated sodium perborate starting material. If drying is attempted at a temperature much higher than about 45°C., the surface of the material will remain wet. In another embodiment of the invention, agglomeration and drying are accomplished in the same apparatus, such as a forced-air rotary dryer.

Although the exact mechanism involved in the process of the invention is not known, it is believed that there is some reaction between the hydrogen peroxide and the starting sodium perborate tetrahydrate wherein part of the water of hydration of the perborate is replaced by hydrogen peroxide or released from the molecule. When hydrogen peroxide is added to sodium perborate tetrahydrate in an amount of 10% by weight, the active oxygen increase is greater than 10%. This phenomenon is indicative of the replacement of some of the water of hydration of the perborate. As a result of the process of the invention, the active oxygen content of the sodium perborate is increased by about 10 to 20% depending upon the amount of hydrogen peroxide added.

The agglomerated product of the process disclosed herein is not fragile like most agglomerated sodium perborate but is rather sturdy and handles well without breaking. The product of the process of the invention has an active oxygen content of about 11.0 to 12.0 weight percent, a bulk density of about 0.40 to 0.70 g./cc., and spherical particles. This product is useful in detergent formulations and does not segregate therefrom as does the conventional sodium tetrahydrate. The product of the invention provides more bleaching power per pound than do the prior art materials because the sodium perborate disclosed herein has a higher active oxygen content.

It is to be understood that in the process of the invention hydrogen peroxide is used as a wetting agent. Low bulk density as described herein is achieved by agglomeration rather than by trapping peroxide in a wet mass of material and then decomposing the peroxide to swell the mass.

Bulk density as used herein is the apparent specific gravity as measured by the free flow method by the following technique.

A stainless steel funnel having a maximum internal diameter of 14 centimeters, a minimum internal diameter of 1.3 centimeters, and an axial height of 14.2 centimeters is clamped in a vertical position onto a ring stand. After the bottom opening of the funnel is covered with a suitable flat implement, the funnel is filed with sodium perborate until it overflows.

A cylindrical cup constructed from stainless steel and having an internal diameter of 5.72 centimeters, a height of 19.0 centimeters, and a capacity of about 500 milliliters is placed vertically below the funnel with the lower end of the funnel being 7.62 ± 0.32 centimeters above the plane of the top of the cup. The sodium perborate is then allowed to flow into the cup from the funnel until the cup is overflowing. The cup is levelled off without compression of its contents. The specific gravity by free flow (bulk density) is the weight in grams of the contents of the cup divided by the capacity of the cup expressed in milliliters. The exact capacity of the cup may be determined by filling the cup with water at room temperature and weighing the contents. The average weight of 5 or 6 such weighings is selected as the milliliter capacity of the cup.

The active oxygen content of the sodium perborate product of the process of the invention can be measured by techniques which are well-known in the art, such as titration of an aqueous, acidified solution of the product with potassium permanganate.

The invention is further described by the following examples which are intended for illustration only and do not limit the invention in any manner. All percentages are by weight

EXAMPLE 1

Into an ordinary household food blender was placed 100 grams of sodium perborate tetrahydrate. After the blender was started at a slow speed, 25% hydrogen peroxide solution was added at the rate of 1 ml./min. until a total of 10 ml. (2.7 g. hydrogen peroxide) had been added. Thereafter the blender was allowed to run for 5 minutes. The maximum product temperature was 23°C. The sodium perborate tetrahydrate-hydrogen peroxide mixture was then transported to a watchglass and allowed to air-dry at ambient conditions (22°C. and 50% relative humidity). After drying the sodium perborate product was again placed into the blender for 1 minute to break the lumps formed. The sodium perborate product having spherical particles was weighed (98 g. recovered) and analyzed for bulk density, active oxygen content and particle size. The results are tabulated below. The cumulative screen analyses give the weight percent of material passing through the various size sieves and illustrate the extent to which agglomeration has occurred.

| | Feed SPB | Product |
|---|---|---|
| Active Oxygen (%) | 10.48 | 11.30 |
| Bulk Density (g./ml.) | 0.92 | 0.57 |
| Screen Analysis — Cumulative % of Material Exceeding Designated Particle Size | | |
| 840 microns | 0 | 22 |
| 590 microns | 3 | 42 |
| 297 microns | 55 | 98 |
| 149 microns | 85 | 100 |
| 44 microns | 98 | — |

EXAMPLE 2

The same apparatus and procedure as described in Example 1 were used in this experiment; however, 5 ml. of 50% hydrogen peroxide solution (3.0 g. hydrogen peroxide) were added to 100 g. sodium perborate tetrahydrate. Maximum product temperature was 24°C. A sodium perborate product having porous spherical particles was obtained. Active oxygen bulk density and cumulative screen analyses results are tabulated below.

|  | Feed SPB | Product |
|---|---|---|
| Active Oxygen (%) | 10.48 | 12.40 |
| Bulk Density (g./ml.) | 0.92 | 0.57 |
| Screen Analysis — Cumulative % of Material Exceeding Designated Particle Size |  |  |
| 840 microns | 0 | 30 |
| 590 microns | 3 | 64 |
| 297 microns | 55 | 97 |
| 149 microns | 85 | 100 |
| 44 microns | 98 | — |

EXAMPLE 3

The same apparatus and procedure as described in Example 1 were used in this experiment; however, 3.1 ml. of 70% hydrogen peroxide solution (2.8 g. hydrogen peroxide) were added to 105 g. sodium perborate wet cake containing 5% water to obtain spherical particles of product. Results are tabulated below.

|  | Feed SPB | Product |
|---|---|---|
| Active Oxygen (%) | 10.29 | 11.67 |
| Bulk Density (g./ml.) | 0.87 | 0.63 |

EXAMPLE 4

Sodium perborate tetrahydrate and hydrogen peroxide were mixed to form a low density agglomerate in a forced-air rotary dryer. The rotary unit was a stainless steel shell 76.2 centimeters × 6.1 meters long which was inclined at 2° slope with internal lifting flights the entire length of the dryer. Warm air was forced countercurrent through the dryer by an exhaust blower. Fines carried out of the dryer were separated by a cyclone and then pneumatically recycled to the agglomerating zone of the dryer. The sodium perborate was fed continuously to the agglomerator-dryer where 17% hydrogen peroxide solution was continuously sprayed onto it (1.0 g. H$_2$O$_2$/100 g. sodium perborate). The mass was thoroughly mixed and dried as it passed through the dryer with the maximum product temperature being 41°C. The product with spherical particles was sampled and analyzed for bulk density, active oxygen and particle size. The results are tabulated below.

|  | Feed SPB | Product |
|---|---|---|
| Active Oxygen (%) | 10.43 | 11.47 |
| Bulk Density (g./ml.) | 0.90 | 0.70 |
| Screen Analysis — Cumulative % of Material Exceeding Designated Particle Size |  |  |
| 1680 microns | 0 | .5 |
| 840 microns | 0 | 2 |
| 297 microns | 23 | 96 |
| 149 microns | 58 | 99 |

EXAMPLE 5

The following experiment was performed according to the procedure of Example 4 with the apparatus described therein. However, 24.4 parts of a 36% solution of hydrogen peroxide were sprayed onto 300 parts sodium perborate (2.8 g. H$_2$O$_2$/100 g. sodium perborate) with the maximum product temperature being 42°C. The results are tabulated below.

|  | Feed SPB | Product |
|---|---|---|
| Active Oxygen (%) | 10.43 | 12.00 |
| Bulk Density (g./ml.) | 0.90 | 0.65 |
| Screen Analysis — Cumulative % of Material Exceeding Designated Particle Size |  |  |
| 1680 microns | 0 | 0.4 |
| 840 microns | 0 | 22 |
| 297 microns | 23 | 100 |
| 149 microns | 58 | — |

The invention claimed is:

1. A process of producing sodium perborate tetraydrate having an active oxygen content of about 11.0 to 12.0 weight percent and a bulk density of about 0.40 to 0.70 g./cc., said process comprising the steps of (1) agglomerating preformed sodium perborate tetrahydrate having an active oxygen content of about 10 to 10.5% by weight and a bulk density of about 0.80 to 0.95 g./cc. with hydrogen peroxide as a wetting agent and binder to form spherical particles and (2) drying the resulting agglomerated sodium perborate particles at a temperature below 45°C. to remove all free water, the amount of hydrogen peroxide used in step (1) being about 0.1 to 15 weight percent based upon the weight of the starting sodium perborate.

2. A process of claim 1 wherein the amount of hydrogen peroxide used in step (1) is from about 1.0 to 3.0 weight percent based on the weight of the product.

3. Sodium perborate tetrahydrate made by the process of claim 1, said sodium perborate having spherical particles, an active oxygen content of from about 11.0 to about 12.0 weight percent and a bulk density of from about 0.40 to 0.70 g./cc and free from organic binder.

* * * * *